Figure 1:
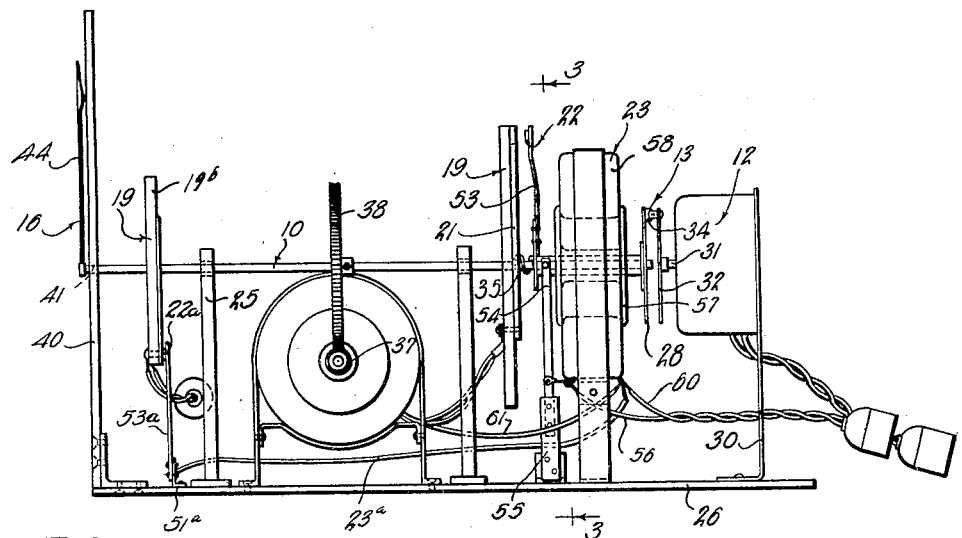

March 29, 1932.  O. R. BULKLEY  1,851,154

CONTROLLER

Filed Oct. 20, 1930  2 Sheets-Sheet 1

INVENTOR
Olcott. R. Bulkley
BY
His ATTORNEY.

March 29, 1932.　　O. R. BULKLEY　　1,851,154
CONTROLLER
Filed Oct. 20, 1930　　2 Sheets-Sheet 2
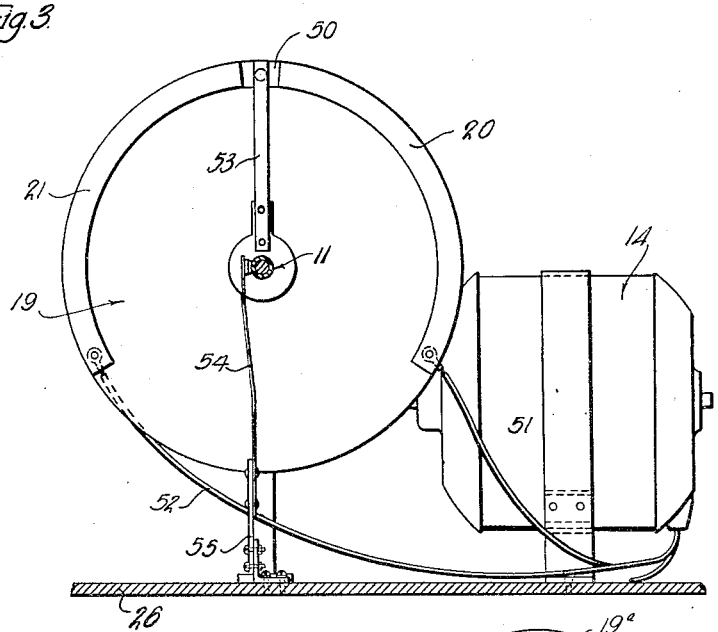
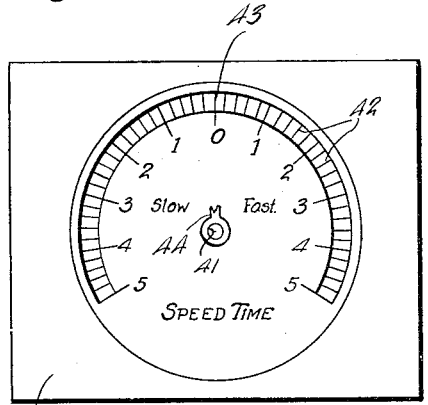
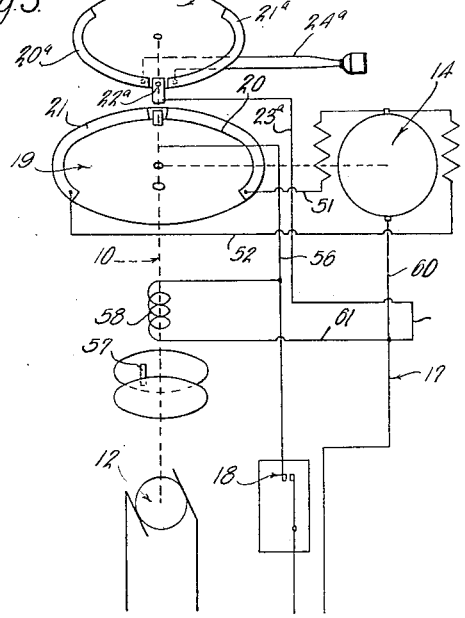
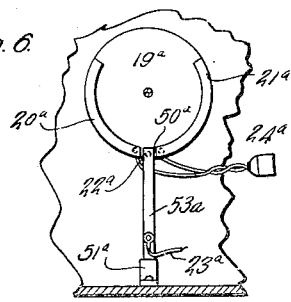
INVENTOR
Olcott R. Bulkley
By
HIS ATTORNEY Patented Mar. 29, 1932

1,851,154

UNITED STATES PATENT OFFICE

OLCOTT R. BULKLEY, OF LONG BEACH, CALIFORNIA

CONTROLLER

Application filed October 20, 1930. Serial No. 489,970.

This invention relates to a controlling device, and relates more particularly to an instrument for controlling, indicating, and/or recording the deviation of the frequency or the speed time of an alternating current from the desired or proper frequency, or speed time.

The use of electric clocks, or other devices actuated by an alternating current and controlled by the frequency of that current, makes it desirable to provide a simple, accurate, and dependable means for controlling, indicating, or recording the speed time error, or the error in the frequency of the circuit. Further, it is desirable to provide an instrument for performing such a function that may be arranged at any suitable point, for example, a central station, and that may be actuted from distant stations by impulses transmitted over a telephone line or other circuit.

By "speed time" is meant the actual time relative to the revolutions per minute of a synchronous motor in an alternating current system, which is dependent upon the average frequency of the system over a period of time. The speed time error remains zero when the average frequency of the system has been correct.

Speed time is often controlled by means of 10 ohm biasing resistances in the frequency controller. This system keeps the time within one-half second, or any desired limit, but results in a jagged and uneven line on the frequency chart and necessitates frequent changes in the zero adjustment. It is an object of this invention to provide a device which will cause this adjustment to be made automatically.

It is a general object of the invention to provide a simple, practical, and effective instrument for controlling, indicating, and/or recording the speed time error of, or the extent of deviation of, the frequency of a power system from the proper frequency.

It is another object of the invention to provide a device of the character mentioned that may be employed to automatically operate a frequency controller of a generator by means of a motor-operated biasing rheostat to automatically make the zero adjustment of said frequency controller.

Another object of the invention is to provide a device that operates to give a continuous indication and/or record of the speed time error of a power system relative to a pendulum clock or other suitable standard of time.

It is another object of the invention to provide an instrument of the character mentioned that may be employed to indicate at a central station the error in the speed time or frequency of a power system remote from said central station. The instrument may be actuated by an impulse transmitted over a telephone line or other circuit employing a synchronous motor at each end of the line to keep the receiver in the same or corresponding position as the transmitter.

It is another object of the invention to provide an instrument of the character mentioned that is dependable and accurate. The instrument provided by this invention is adapted to indicate the error in the speed time or frequency of a system to within one-twenty-fifth of a second.

It is a further object of the invention to provide an instrument of the character mentioned that may operate continuously without accumulating error in the indications given or the records made, and without requiring manual adjustment or re-setting.

Figure 2:
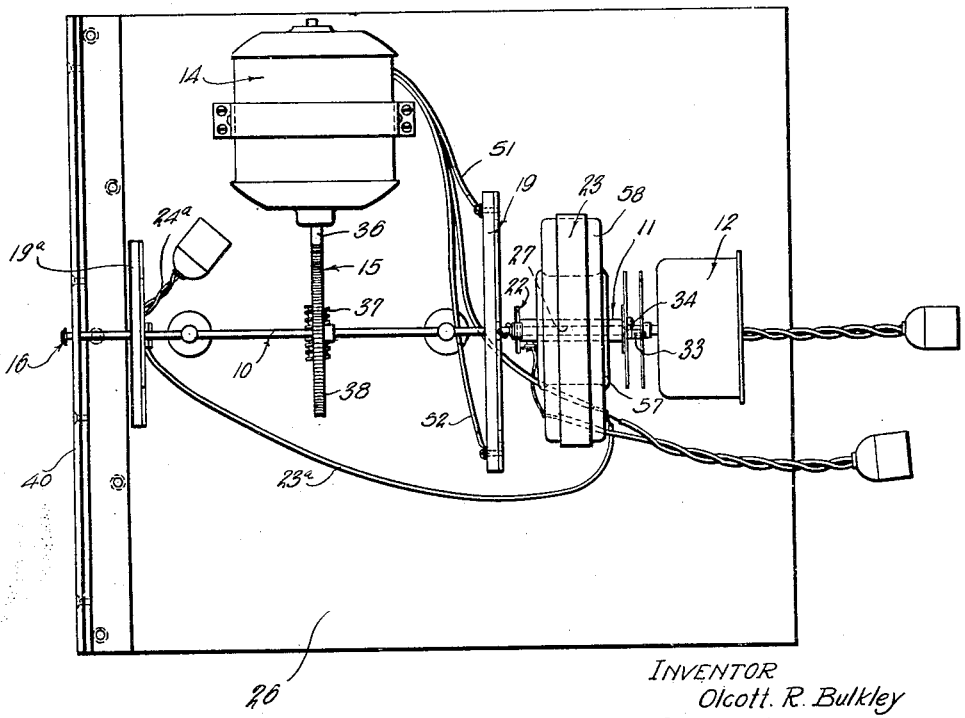

Other objects and features of the invention will be best and more fully understood from the following detailed description of a typical form and application of the invention, throughout which description reference is had to the accompanying drawings, in which:

Fig. 1 is a side elevation of the device provided by the present invention, illustrating the parts in the normal or unactuated position. Fig. 2 is a top or plan view of the instrument. Fig. 3 is an enlarged vertical detailed sectional view taken substantially as indicated by line 3—3 on Fig. 1. Fig. 4 is a front elevation of the indicating means incorporated in the device, Fig. 5 is a wiring diagram of the apparatus, and Fig. 6 is a reduced vertical sectional view taken as indicated by the line 6—6 on Fig. 1.

The controlling, indicating, or recording device provided by this invention includes, generally, a rotatable shaft 10, an element 11 freely rotatable and slidable on the shaft 10, a continuously rotating synchronous motor 12 in, or operated by, the alternating current system to be checked, a normally engaged drive 13 between the motor 12 and the element 11, a reversing motor 14, a drive 15 between the motor 14 and the shaft 10, a control means 19ª on the shaft 10, indicating means 16 on the shaft 10, a circuit 17 for actuating the motor 14 when the speed time of the alternating current system is in error, normally open contacts 18 in the circuit 17 adapted to be closed at suitable intervals by any time standard means, such as a master or contact-making clock, a dial switch 19 on the shaft 10 having a segmental contact 20 electrically connected with the forward field of the motor 14 and having a segmental contact 21 connected with the reversing field of the motor 14, a contact 22 in the circuit 17 carried by the element 11 adapted to engage either of the contacts 20 or 21 and normally out of engagement with the contacts, and means 23 operable by the impulses passed through the circuit 17 to shift the element 11 to disengage the drive 13 and bring the contact 22 into engagement with the dial switch 19 to cause energization of the motor 14 in the event that the speed time of the system to be checked is in error.

The shaft 10 is provided to carry the element 11, the dial switch 19, the controlling means 19ª, the indicating means 16, or any other device for indicating or recording the error in the system to be checked. In the particular case illustrated, the shaft 10 is horizontally disposed and is rotatably supported on a suitable base board 26.

The element 11 is freely rotatable and slidable on the shaft 10, and is preferably arranged adjacent one end of the shaft. In the preferred form of the invention, the element 11 is in the nature of a drum or spool formed of brass or other suitable material. The opening 27 in the element 11, for passing the shaft 10, may be lined with a suitable insulating material. A circular disc 28 is provided on the outer end of the element 11. The disc 28 is preferably formed of iron or other magnetic material.

The synchronous motor 12 is actuated by the alternating current system to be checked and corrected by the instrument, and is continuously operating. The synchronous motor 12 is preferably mounted a short distance from the end of the shaft 10, carrying the free element 11. In the particular case illustrated in the drawings, the motor 12 is supported on the base board 26 through a suitable bracket 30. The motor 12 is preferably mounted so that its driven shaft 31 is concentric to the shaft 10. In practice, the motor 12 may be geared down so that the shaft 31 is rotated at a comparatively low rate of speed, say, at the speed of four revolutions per minute.

In accordance with the broader principles of the invention, any suitable form of releasable drive may be provided between the motor driven shaft 31 and the element 11. In the simple form of the invention illustrated, a disc 32 is mounted on the shaft 31 and carries a pin 33 for engaging a pin or lug 34 on the disc 28. The pin 33 normally co-operates with the lug 34 to cause the element 11 to rotate with the shaft 31. The disc 32 is preferably formed of bakelite or other suitable insulating material. The element 11 is normally yieldingly retained in a position where the lug 34 is in engagement with the pin 33. A helical compression spring 35 may be arranged under compression between the inner end of the element 11 and the dial contact 19 to normally retain the element in a position where the lug 34 is engaged by the pin 33.

The reversing motor 14, or other suitable power means, is provided to rotate the shaft 10 upon the contact 22 contacting with either of the segmental contacts 20 or 21. The motor 14 may be mounted on the base board 26 so that its shaft 36 is below and transverse of the shaft 10. In the particular case illustrated, the motor 14 is spaced at one recording means on the shaft 10.

When an impulse is sent through the circuit 17, and the alternating current system is in error, the motor 14 is operated, rotating the shaft 10 and actuating the control means 19ª, the indicating means 16, and/or suitable recording means on the shaft 10.

The drive 15 between the reversing motor 14 and the shaft 10 is preferably in the nature of a direct positive mechanical drive. In the embodiment of the invention illustrated in the drawings, the drive 15 is in the nature of a worm drive and includes a worm 37 on the shaft 36 meshing with a worm wheel or gear 38 on the shaft 10. The worm gear 38 may have a comparatively large effective diameter to provide for the desired ratio of speed between the shafts 36 and 10.

In accordance with the broader principles of the invention, the shaft 10 may be employed to actuate various forms of controlling, indicating, recording, or actuating devices, depending upon the application of the invention. It is to be understood that the invention is not to be restricted as limited to the specific type of indicating means 16 and the controlling means 19ª, nor to indicating or controlling means of any specific character, as the shaft 10 may be readily employed for operating various devices or combinations of devices. The particular indicating means 16 illustrated in the drawings is adapted to indicate the extent of error in the speed time of the circuit to be checked. As illustrated in the drawings, the means 16 includes a vertically disposed plate 40 projecting upwardly from the base board 26. The shaft 10 projects through an opening 41 in the plate 40. Spaced radial marks or graduations 42 are provided on the outer side of the plate 40 around the shaft opening 41. The graduations 42 may be spaced to represent an error of one-fifth of a second, and numerical characters may be provided at every fifth graduation. In the arrangement shown in Fig. 4 of the drawings, a plurality, say, twenty-five graduations 42, are arranged at each side of a central or zero correction point 43 on the scale. A hand is mounted on the projecting portion of the shaft 10 to travel over the dial or scale of markings 42. When the hand 44 is at the zero point 43, there is no speed time error in the system being checked.

The circuit 17 is provided to carry impulses from a standard of time means to energize the means 23 and the motor 14. One side or wire of the circuit is connected with the motor 14. The contact device 18 is connected in, or controls, the other side or wire of the circuit. The contact device 18 may be any suitable type of device for causing impulses to be passed through the circuit 17 and may be operated by any suitable form of a standard of time means. The contact device 18 may be operated by a pendulum clock, or the like, at regular intervals, say, once each minute. The means for operating the contact device 18 may be in the nature of a standard of time for a clock system, or the like.

The dial switch 19 is mounted on the shaft 10 to rotate therewith. The dial 19 is in the nature of a circular disc of insulating material, and is spaced from the inner end of the element 11. The segmental contacts 20 and 21 are provided in the side of the disc 19, facing the element 11. The contacts 20 and 21 are preferably flush with the face or side of the disc and may be arranged adjacent its perimeter. The contacts are preferably of the same length, or extend around the perimeter of the disc the same number of degrees. The contact 20 is in the same rotative position as the fast portion of the graduations or scale 42, while the contact 21 is in the same rotative position as the slow side of the scale 42 when the system to be checked is correct. A neutral or zero segment 50 is provided between the adjacent ends of the contacts 20 and 21. The zero portion 50 is of suitable insulating material and spaces the contacts 20 and 21. The zero space 50 is normally in the same rotative position as the zero point of correction 43 on the dial 42.

The segmental contact 20 is electrically connected to the forward or clockwise field of the motor 14 by a conductor 51, and the contact 21 is connected with the reverse or counterclockwise field of the motor by a conductor 52.

The contact 22 is carried by the element 11 and is adapted to co-operate with the disc 19 to contact with either of the contacts 20 or 21, or the neutral point 50, upon energization of the means 23. The contact 22 is normally spaced from, and out of, engagement with the disc 19. In the particular case illustrated, the contact 22 is in the nature of a contact carried on a spring arm 53. The arm 53 projects radially from the inner end of the element 11, and the contact 22 is carried at the outer end of the arm to be in position to engage either of the contacts 20 or 21. The contact or spring arm 53 is electrically connected in one side of the circuit 17. In the particular case illustrated, a brush or spring contact 54 is arranged to contact with the element 11 at the base of the arm 53. The spring contact 54 may be carried by a suitable clip or bracket 55 on the base board 26, and is connected in the circuit 17 by a conductor 56.

The means 23 for shifting the element 11 acts to slide the element 11 longitudinally along the shaft 10, upon an impulse being passed through the circuit 17, to release the drive 13 and to bring the contact 22 into engagement with the dial or disc 19. The means 23 is preferably in the nature of an electromagnetic means that is energized by the impulses passed through the circuit 17. In accordance with the preferred form of the invention, the means 23 includes a solenoid coil having its core 57 surrounding the element 11. The core 57 freely passes the element 11 so that it is free to slide and rotate on the shaft 10. The winding 58 of the solenoid coil is wound so that it magnetizes or creates a magnetic field or flux in the core 57 which attracts or acts on the magnetic disc 28 to slide the element 11 along the shaft 10 against the action of the spring 35 to release the drive 13 and to bring the contact 22 into engagement with the disc 19. One lead of the winding 58 may be connected with the conductor 56, while a conductor 60 may be connected with the other end or lead of the winding. In practice, one side or phase of the circuit 17 may pass through the conductor 60 and a lead 61 to the motor 14. The magnetic forces in the core 57, created upon energization of the winding 58, act on the disc 28 and prevent rotation of the element 11 immediately upon the drive 13 being released and during the time that the contact 22 is in engagement with the disc 19.

The means 19ª is provided to control or energize a circuit for operating a frequency controller, or the like. The means 19ª may be employed to control the energizing circuit of a frequency controller for controlling or correcting the frequency of the system being checked by the instrument. In the particular case illustrated, the means 19ª includes, generally, a dial switch 19ᵇ on the shaft 10 carrying a segmental contact 20ª and a segmental contact 21ª, a contact 22ª adapted to engage either of the contacts 20ª or 21ª and normally out of engagement with the contacts, a two conductor control circuit 24ª having one conductor connected to the contact 20ª and the other connected to the contact 21ª, a single conductor circuit 23ª to energize the contact 22ª.

The dial switch 19ᵇ may be mounted on the shaft to rotate with the shaft in a manner similar to the dial switch 19. The dial 19ᵇ is in the nature of a circular disc of insulating material and may be mounted at any point on the shaft 10. In the drawings, it is shown positioned between a pedestal 25 and the vertical plate 40. The segmental contacts 20ª and 21ª, and the finger contact 22ª adapted to engage these contacts, may be on either side of the dial. The segmental contacts 20ª and 21ª are preferably of the same length and extend around the perimeter of the disc 19ᵇ the same number of degrees. A neutral or zero segment 50ª is provided between the adjacent ends of the contacts 20ª and 21ª, and may be made of any suitable insulating material. The zero segment 50ª may be in any rotative position. In the particular form of my invention illustrated, the zero segment is positioned at the bottom of the dial swith when the device is in a position of zero adjustment.

The contact 22ª is mounted on, and insulated from, the base 26. This may be accomplished in any suitable manner. A clip angle 51ª of bakelite may be used, having a horizontal leg secured to the base 26. A vertically disposed spring arm 53ª may carry the contact 22ª. The lower end of the spring arm 53ª may be secured to the vertical leg of the clip 51ª, and the upper end of the arm may carry the contact 22ª. The contact 22ª is at all times in frictional engagement with the face of the dial 19ᵇ which carries the segmental contacts 20ª and 21ª. The contact 22ª is so positioned that it contacts the zero segment 50ª of the dial switch when the device is in a position of zero correction. When the shaft revolves, the contact 22ª makes connection with one of the segmental contacts.

The single conductor circuit 23ª keeps the contact 22ª energized at all times from any suitable source. Circuit 23ª may receive its energy from the leg 60 of the control circuit 17 which actuates the solenoid 58. One leg of the control circuit 24ª is secured to the segmental contact 20ª and the other leg is secured to the segmental contact 21ª. Rotation of the dial switch 19ᵇ in either direction causes energization of one of the conductors in the control circuit 24ª.

In operation, the contact device 18 at the master clock may be made to impart single long impulses to the circuit 17 at regular intervals of time. Upon an impulse being passed through the circuit 17, the winding 58 of the coil magnetizes the core 57 to cause it to draw the disc 28 toward it and into engagement with its end. Upon the element 11 being slid along the shaft 10 in this manner, the drive 13 is disengaged and the contact 22 is moved into engagement with the dial or disc 19. In the event that the speed time error of the system operating the synchronous motor 12 has not increased or decreased since the last comparison or operation of the element 11, the element 11 will be stopped by the action of the winding 58 in a rotative position, where the contact 22 will be brought into engagement with the neutral point 50 on the disc 19. When this occurs, the motor 14 is not energized, and the hand 16 remains in a zero position, where it points to the zero correction point 43, and the contact 22ª remains in engagement with the zero point 50ª. In the event that the speed error is in the fast direction, the element 11 will be stopped and slid along the shaft in a rotative position where the contact arm 22 engages the contact 20. When this occurs, current is passed through the conductor 51 to the forward field of the motor 14 to cause the disc 19 to be rotated and bring the neutral point 50 into contact with the contact 22, and the dial 19ᵇ is rotated to a position where the contact 22ª engages the contacts on the dial 19ᵇ. The hand 44 will indicate on the dial 42 the extent of movement of the shaft 10 and disc 19 and the error in seconds or fractions of a second in the alternating current system. In the event that the contact 22 is brought into engagement with the segmental contact 21 when the impulse is passed through the circuit 17, the reversing field of the motor 14 is energized to cause the disc 19 to be rotated in a direction to bring the neutral point 50 under the contact 22 so that the shaft 10 is stopped in a position where the hand 44 indicates the extent of error in the system.

The apparatus is constructed so that, upon energization of the means 23, the disconnection of the drive 13 and the engagement of the contact 22 with the disc 19 is simultaneous. The motor 14 has a very slight load, so that it starts immediately upon being energized and the hand 44 is operated to a position where it indicates the extent of error in the alternating current system.

The contact 22ª is always in engagement with the disc 19ª. When the contact 22ª is contacting the zero segment 50ª of the dial switch 19ᵇ, no energization of either of the conductors of the circuit 24ª takes place. When the shaft 10 has been rotated to a point where the contact 22ª engages either of the segmental contacts 20ª or 21ª, the conductor of the circuit 24ª attached to that segmental contact is energized. When one of the conductors of the circuit 24ᵃ is energized, it remains energized until the shaft 10 has been rotated to a position where the contact 22ᵃ engages the neutral or zero connection segment 50ᵃ.

Controlling of speed time has been commonly accomplished by means of 10 ohm biasing resistors in the frequency controller, the zero adjustment of which requires changing. This disadvantage can be eliminated by the use of the device provided by the present invention. It will be obvious that the controller may be used in various manners to operate and/or control devices of different characters. The shaft 10 may be employed to actuate or control mechanically operable devices and instruments while the control circuit 24ᵃ may be utilized to control and/or operate an electrically controlled device for example, a motor operated biasing rheostat to govern the speed time. A motor-operated biasing rheostat may be used in the bridge circuit in place of the biasing resistors. The two legs of the circuit 24ᵃ may be used to energize the rheostat motor, energization of one tending to operate the rheostat in one direction to raise the frequency, and the energization of the other tending to operate the rheostat in the other direction to lower the frequency. By making the changes very gradual, the biasing rheostat will automatically make the zero adjustment of the controller and will hold the speed time within very close limits without causing any appreciable swings in the frequency chart. The use or manner of using the instrument just set forth is merely an example of one of its applications and is not to be taken as limiting or restricting the invention.

It will be apparent that the present invention provides an instrument that accurately indicates the extent of error in the speed time or frequency of an alternating current system, and that it is adapted to control the operation of a device for example, a frequency controller for automatically controlling the speed time error in the system. The instrument may also be employed to operate a recording device for recording the extent of error, if any, in a system over a long period of time.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. An instrument of the character described, useful for correcting and/or indicating the speed time error of an alternating current system, including a shaft, a synchronous motor operated by the alternating current, a rotatable and shiftable element, a releasable rotative drive between the synchronous motor and the element, normally inoperative means for rotating the shaft, a control circuit, a contact on the shaft electrically connected with the means for rotating the shaft, a contact on the element normally out of engagement with the first-mentioned contact, and means operable upon the energization of the control circuit to shift the element to release the drive and to bring the contacts into engagement and cause energization of the means for rotating the shaft.

2. An instrument of the character described, for use in connection with an alternating current system, including a shaft, a rotatable and shiftable element, a synchronous motor continuously operated by the alternating current system, a releasable rotative drive between the motor and the element, a normally inoperative reversible electrically actuated means for rotating the shaft, an energizing circuit for the said means, a contact on the element and connected in the energizing circuit, spaced contacts on the shaft adapted to be engaged by the contact on the element, one of the spaced contacts being connected with the said means to cause it to operate the shaft in a forward direction upon being engaged by the contact on the element, the other being connected with the means to cause it to operate the shaft in a rearward direction upon being engaged by the contact on the element, means operable by an impulse in the energizing circuit to shift the element along the shaft to release the drive and to bring the contact in position to engage either of the spaced contacts depending upon the speed time of the alternating current system, and a standard of time means operable to send impulses through the energizing circuit at regular intervals to energize the first-mentioned and the second-mentioned means.

3. An instrument of the character described, for use in connection with an alternating current system including a shaft, a freely rotatable and slidable element, a synchronous motor operated by the alternating current system, a releasable rotative drive between the motor and the element, electrically actuated means for rotating the shaft in either rotative direction, the said means being normally idle, an energizing circuit for the said electrically actuated means, a contact on the element connected in the energizing circuit, spaced segmental contacts on the shaft and in the energizing circuit adapted to be engaged by the said contact, one of the segmental contacts being connected with the said means to cause it to operate the shaft in the forward direction, the other being connected with the said means to cause it to operate the shaft in the rearward direction, means operable to pass impulses through the energizing circuit at regular intervals of time, and means operable by the impulses to shift the element to release the drive and bring the contact on the element into engagement with either one of the segmental contacts in the event that there is an error in the speed time of the alternating current system.

4. In an instrument of the character described for use in connection with an alternating current power system, a shaft, a freely rotatable and slidable element, a synchronous motor operated by the power system, a releasable drive between the motor and the element, an energizing circuit, a contact on the element connected in the energizing circuit, a reversible motor for rotating the shaft in either direction, spaced contacts carried by the shaft and adapted to be engaged by the said contact on the element, one of the spaced contacts being connected with the forward field of the reversible motor, the other being connected with the reversing field of the motor, means for sending impulses through the energizing circuit at regular intervals of time, and electro-magnetic means operable by an impulse to shift the element to release the drive and bring the contact into engagement with either one of the spaced contacts in the event that speed time of the alternating current system is in error.

5. An instrument of the character described, useful for indicating the error in the frequency of an alternating current system, including a shaft, a synchronous motor operated by the alternating current, a freely rotatable and shiftable element, a releasable rotative drive between the synchronous motor and the element, normally inoperative means for rotating the shaft, a control circuit for the means for rotating the shaft, a contact on the shaft electrically connected with the means for rotating the shaft, a contact on the element normally out of engagement with the first-mentioned contact, and means operable upon an impulse being passed through the control circuit to shift the element to release the drive and to bring the contacts into engagement, in the event that the alternating current system is in error, and cause energization of the means for rotating the shaft, including a solenoid coil in the control circuit to shift the element.

6. In an instrument of the character described for use in connection with an alternating current power system, a shaft, a freely rotatable and shiftable element, a synchronous motor operated by the power system, a releasable drive between the motor and the element, an energizing circuit, a contact on the element connected in the circuit, a reversible motor operable by the energizing circuit for rotating the shaft in either direction, spaced contacts carried by the shaft and adapted to be engaged by the contact on the element, one of the said spaced contacts being connected with the forward field of the reversible motor, the other being connected with the reversing field of the motor, means for sending impulses through the energizing circuit at regular intervals of time, indicating means on the shaft, and electro-magnetic means operable by an impulse to shift the element to release the drive and bring the contact into engagement with either one of the spaced contacts in the event that the speed time in the alternating current system is in error.

7. An instrument of the character described for use in connection with an alternating current system, including a shaft, an element freely rotatable and slidable on the shaft, a synchronous motor continuously operated by the alternating current system, a releasable rotative drive between the motor and the element, a normally inoperative reversible electrically actuated means for rotating the shaft, an energizing circuit for the said means, a contact on the element and connected in the energizing circuit, spaced contacts on shaft adapted to be engaged by the contact on the element, one of the spaced contacts being connected with the said means to cause it to operate the shaft in a forward direction upon being engaged by the contact on the element, the other being connected with the means to cause it to operate the shaft in a rearward direction upon being engaged by the contact on the element, means yieldingly holding the element in a position where the drive is engaged and the contact on the element is spaced from the spaced contacts, means operable by an impulse in the energizing circuit to shift the element along the shaft to release the drive and to bring the contact in position to engage either of the spaced contacts depending upon the speed time of the alternating current system, and a standard of time means operable to send impulses through the energizing circuit at regular intervals to energize the first-mentioned and the second-mentioned means.

8. An instrument of the character described for use in connection with an alternating current system, including a shaft, an element freely rotatable and slidable on the shaft, a synchronous motor continuously operated by the alternating current system, a releasable rotative drive between the motor and the element, a normally inoperative reversible electrically actuated means for rotating the shaft, an energizing circuit for the said means, a contact on the element and connected in the energizing circuit, spaced contacts on the shaft adapted to be engaged by the contact on the element, one of the spaced contacts being connected with the said means to cause it to operate the shaft in a forward direction upon being engaged by the contact on the element, the other being connected with the means to cause it to operate the shaft in a rearward direction upon being engaged by the contact on the element, spring means yieldingly holding the element in a position where the drive is engaged and the contact on the element is spaced from the spaced contacts, means operable by an impulse in the energizing circuit to shift the element along the shaft to release the drive and to bring the contact in position to engage either of the spaced contacts depending upon the speed time of the alternating current system, and a standard of time means operable to send impulses through the energizing circuit at regular intervals to energize the first-mentioned and the second-mentioned means.

9. In an instrument of the character described for use in connection with an alternating current power system, a shaft, a freely rotatable and shiftable element, a synchronous motor operated by the power system, a releasable drive between the motor and the element, an energizing circuit, a contact on the element connected in the circuit, a reversible motor operable by the energizing circuit for rotating the shaft in either direction, a dial of insulating material on the shaft, spaced segmental contacts on the dial adapted to be engaged by the contact on the element, one of the segmental contacts being connected with the forward field of the motor, the other being connected with the reversing field of the motor, means for sending impulses through the energizing circuit at given intervals of time, and means operable by an impulse in the said circuit to shift the element to release the drive and bring the contact on the element into engagement with the dial where it may engage either of the segmental contacts in the event that there is an error in the alternating current system.

10. In an instrument of the character described for use in connection with an alternating current power system, a shaft, a freely rotatable and slidable element, a synchronous motor operated by the power system, a releasable drive between the motor and the element, an energizing circuit, a contact on the element connected in the circuit, a reversible motor operable by the energizing circuit to rotate the shaft in either direction, a dial of insulating material on the shaft, spaced segmental contacts on the dial adapted to be engaged by the contact on the element, one of the segmental contacts being connected with the forward field of the motor, the other being connected with the reversing field of the motor, means for sending impulses through the energizing circuit at given intervals of time, and means operable by an impulse in the said circuit to shift the element to release the drive and bring the contact on the element into engagement with the dial, where it may engage either of the segmental contacts in the event that there is an error in the alternating current system, the said reversible motor being operable to rotate the shaft in either direction, when the alternating current system is in error, to move the segmental contact out of engagement with the contact on the element.

11. An instrument of the character described, useful for indicating the error in the frequency of an alternating current system, including a shaft, a synchronous motor operated by the alternating current, a freely rotatable and shiftable element, a releasable rotative drive between the synchronous motor and the element, normally inoperative means for rotating the shaft, a control circuit, a contact on the shaft electrically connected with the means for rotating the shaft, a contact on the element normally out of engagement with the first-mentioned contact, and means operable upon an impulse being passed through the control circuit to shift the element to release the drive and to bring the contacts into engagement in the event that the alternating current system is in error and cause energization of the means for rotating the shaft, including a part of magnetic material on the element, and a solenoid coil having a core adapted to attract said part.

12. An instrument of the character described for use in connection with an alternating current system, including a shaft, an element freely rotatable and slidable on the shaft, a synchronous motor continuously operated by the alternating current system, a releasable rotative drive between the motor and the element, a normally inoperative reversible electrically actuated means for rotating the shaft, an energizing circuit for the said means, a contact on the element and connected in the energizing circuit, spaced contacts on the shaft adapted to be engaged by the contact on the element, one of the spaced contacts being connected with the said means to cause it to operate the shaft in a forward direction upon being engaged by the contact on the element, the other being connected with the means to cause it to operate the shaft in a rearward direction upon being engaged by the contact on the element, means for sending impulses through the energizing circuit at regular intervals, and means for shifting the element to release the drive and to bring the contact on the element to a position to engage the spaced contacts, including a part of magnetic material on the element, and a solenoid coil having its core surrounding the element and operable to attract the said part.

13. An instrument of the character described for use in connection with an alternating current system, including a shaft, an element freely rotatable and slidable on the shaft, a synchronous motor continuously operated by the alternating current system, a releasable rotative drive between the motor and the element, a normally inoperative reversible electrically actuated means for rotating the shaft, an energizing circuit for the said means, a contact on the element and connected in the energizing circuit, spaced contacts on the shaft adapted to be engaged by the contact on the element, one of the spaced contacts being connected with the said means to cause it to operate the shaft in a forward direction upon being engaged by the contact on the element, the other being connected with the means to cause it to operate the shaft in a rearward direction upon being engaged by the contact on the element, means for yieldingly holding the element in a position where the drive is engaged and the contact on the element is spaced from the spaced contacts and for automatically returning the element to the said position after actuation of the instrument.

14. An instrument of the character described for controlling and/or indicating the speed time error of an alternating current system, including a shaft, a synchronous motor, an element, a rotative drive between the motor and the element, means for rotating the shaft, a control circuit, a contact on the shaft electrically connected with the means for rotating the shaft, a contact on the element operable to engage the first-mentioned contact, means operable upon energization of the control circuit to shift the element to release the drive and bring the contacts into engagement, in the event that the speed time of the alternating current system is in error, and cause energization of the means for rotating the shaft, a control contact on the shaft, a circuit to energize the control contact while the speed time of the alternating current system is in error, and a control circuit connected with the control contact.

15. An instrument of the character described useful for controlling and/or indicating the speed time error of an alternating current system, including a shaft, a rotatable element on the shaft, a synchronous motor to drive the element, a releasable drive between the motor and the element, a switch on the shaft, contacts on the switch, a motor adapted to rotate the shaft, and a circuit between the switch contacts and the motor, means to disengage the releasable drive at regular time intervals, a contact on the element adapted to engage the switch contacts when the drive is released, a control circuit to energize the contact on the element, a control switch on the shaft, contacts on the control switch, means to energize one or the other contacts on the control switch when the shaft has been rotated, and an electrical circuit controlled by the control switch.

16. An instrument of the character described for use in connection with an alternating current circuit including, a rotatable shaft, a rotatable and shiftable element, a synchronous motor, a releasable rotative drive between the element and the synchronous motor, reversible means for rotating the shaft, an actuating circuit for the said means, a control switch for the actuating circuit including spaced contacts carried by the shaft, and a contact on the element normally spaced from the said spaced contacts and operable upon shifting of the element to cooperate with one of the spaced contacts, and means for shifting the said element at regular intervals to release the rotatable drive and to actuate the control switch.

17. An instrument of the character described for use in connection with an alternating current circuit including, a rotatable shaft, a rotatable and shiftable element, a synchronous motor, a releasable rotative drive between the element and the synchronous motor, reversible means for rotating the shaft, an actuating circuit for the said means, a control switch for the actuating circuit including spaced contacts carried by the shaft, and a contact on the element normally spaced from the said spaced contacts and operable upon shifting of the element to cooperate with one of the spaced contacts, means for shifting the element at regular intervals to release the rotatable drive and to actuate the control switch, and indicating means on the shaft.

In witness that I claim the foregoing I have hereunto subscribed my name this 11th day of October, 1930.

OLCOTT R. BULKLEY.